United States Patent
Ku (10) Patent No.: US 6,644,482 B2
(45) Date of Patent: *Nov. 11, 2003

(54) OPTICAL DISK HOLDING APPARATUS

(75) Inventor: Chia-Chun Ku, Taipei (TW)

(73) Assignee: Sinta Technology Corp., Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/919,824

(22) Filed: Aug. 2, 2001

(65) Prior Publication Data

US 2002/0195409 A1 Dec. 26, 2002

(30) Foreign Application Priority Data

Jun. 22, 2001 (CN) .......................... 1129614 U (51) Int. Cl.⁷ ............................... B65D 85/57
(52) U.S. Cl. .................. 211/40; 211/41.12; 206/308.1; 206/310; 312/9.59; 312/9.61
(58) Field of Search ................ 211/40, 41.12; 206/308.1, 309, 310; 248/205.3, 918; 312/9.9, 9.58, 9.61, 9.59

(56) References Cited

U.S. PATENT DOCUMENTS

| 2,773,727 | A | * | 12/1956 | Bradley | 211/40 |
|---|---|---|---|---|---|
| 2,922,527 | A | * | 1/1960 | Finn | 211/40 |
| 2,983,387 | A | * | 5/1961 | Klein | 211/40 |
| 4,134,525 | A | * | 1/1979 | Respoli | 211/65 |
| 4,699,267 | A | * | 10/1987 | Burke | 211/34 |
| D348,575 | S | * | 7/1994 | Dunn | D6/457 |
| 5,551,657 | A | * | 9/1996 | Liethen | 248/205.2 |
| 5,697,684 | A | * | 12/1997 | Gyovai | 211/40 |
| 5,813,740 | A | * | 9/1998 | Chang | 312/9.46 |
| D419,358 | S | * | 1/2000 | Marcon | D6/407 |
| 6,012,692 | A | * | 1/2000 | Meck | 248/222.14 |
| 6,048,042 | A | * | 4/2000 | Chan | 312/9.11 |
| 6,238,022 | B1 | * | 5/2001 | Chan | 312/9.11 |
| D469,622 | S | * | 2/2003 | Marsilio et al. | D6/407 |

* cited by examiner

Primary Examiner—Daniel P. Stodola
Assistant Examiner—Erica B Harris
(74) Attorney, Agent, or Firm—Birch, Stewart, Kolasch & Birch, LLP (57) ABSTRACT

An optical disk holding apparatus consists of a hanging unit and a holding unit. The hanging unit includes a plate member slightly larger than the optical disk, a snap clip located on the plate member for clipping the optical disk and a hanging hook extending from the plate member. The holding unit includes at least an elevated carrying member. The optical disk may be clipped by the snap clip and held on the hanging unit. The hanging unit may be hung on the carrying member through the hanging hook. A plurality of hanging units may be hung and housed in the holding unit for storing.

20 Claims, 11 Drawing Sheets

OPTICAL DISK HOLDING APPARATUS

FIELD OF THE INVENTION

The present invention relates to an optical disk holding apparatus and particularly an apparatus that has hanging units to carry optical disks and built-in hooks on the hanging units to hang on holding units for storing the optical disks.

BACKGROUND OF THE INVENTION

Optical disks are the most popular recording medium nowadays. They have huge capacity and great reliability. Hence they are widely used for storing data such as music, images, computer software and the like.

In order to protect the optical disks from being damaged, there are many optical disk housing products being developed and marketed, such as optical disk cartridges, optical disk pouches, optical disk support racks and optical disk containers. The optical disk cartridge is generally a box with a spline chuck in the center for engaging with the center opening of an optical disk. Once the optical disk is placed inside, the box may be closed.

The optical disk pouch is usually a bag-like container made of a non-woven fabric for directly holding an optical disk inside. Its protection effect is inferior to the optical disk cartridge. In general, a plurality of optical disk pouches may be put together and held in a larger optical disk packet.

The optical disk support rack is generally an open type stand with a plurality of holding segments. The support rack cannot directly hold the optical disks, but is mainly to house the optical disk cartridges in the holding segments, with the optical disks held in the cartridges.

The optical disk container generally has a plurality of carriers for holding optical disks and a cabinet for housing or supporting the carriers. Classified by retrieving and loading movements, the most commonly used containers are sliding types and swiveling types. That is, the linkage method between the carriers and the cabinet utilizes either slide tracks or pivotal hinges to allow the carriers to be moved out of the cabinet in selected ways for users to retrieve or load the optical disks. As the carriers and cabinet have special linkage relationships formed therebetween, they need special matching and engaging designs and constructions. Thus conventional containers have more complex structures, particularly on the linkage mechanisms between the carriers and cabinet. As a result, they require more production and assembly time, and are more costly to make.

Furthermore, the optical disk containers should be made with different dimensional specifications for housing different numbers of carriers at selected locations, to allow the optical disks to be held in the carriers and cabinet in an organized way to fully utilize the limited cabinet space. To achieve this end, the carriers should be packed tightly and have very small tolerance between the neighboring carriers. As the carriers have very limited area for people to retrieve and move, it is easy to mistakenly remove a carrier adjacent to that which the user intends to retrieve. This is troublesome and could result in operation errors.

SUMMARY OF THE INVENTION

In view of the foregoing disadvantages, the primary object of the invention is to provide an optical disk holding apparatus that employs a hanging means to store the optical disks.

The optical disk holding apparatus according to the invention consists of a holding unit and a hanging unit. The holding unit includes at least an elevated carrying member. The hanging unit is a plate member slightly larger than the optical disk that has a snap clip to clip the optical disk, and a hanging hook extended outwards from it. The snap clip holds the optical disk securely on the plate member. The hanging unit may be hung on the carrying member in the holding unit through the hanging hook. Thus a novel optical disk storing method is formed.

The foregoing, as well as additional objects, features and advantages of the invention will be more readily apparent from the following detailed description, which proceeds with reference to the accompanying drawings.

BRIEF DESCRIPTION OF THE DRAWINGS

FIGS. 2A, 2B, 2B-1, 2B-2, AND 2C are schematic views of a hanging unit for the first embodiment.

DESCRIPTION OF THE PREFERRED EMBODIMENTS

Figure 1:
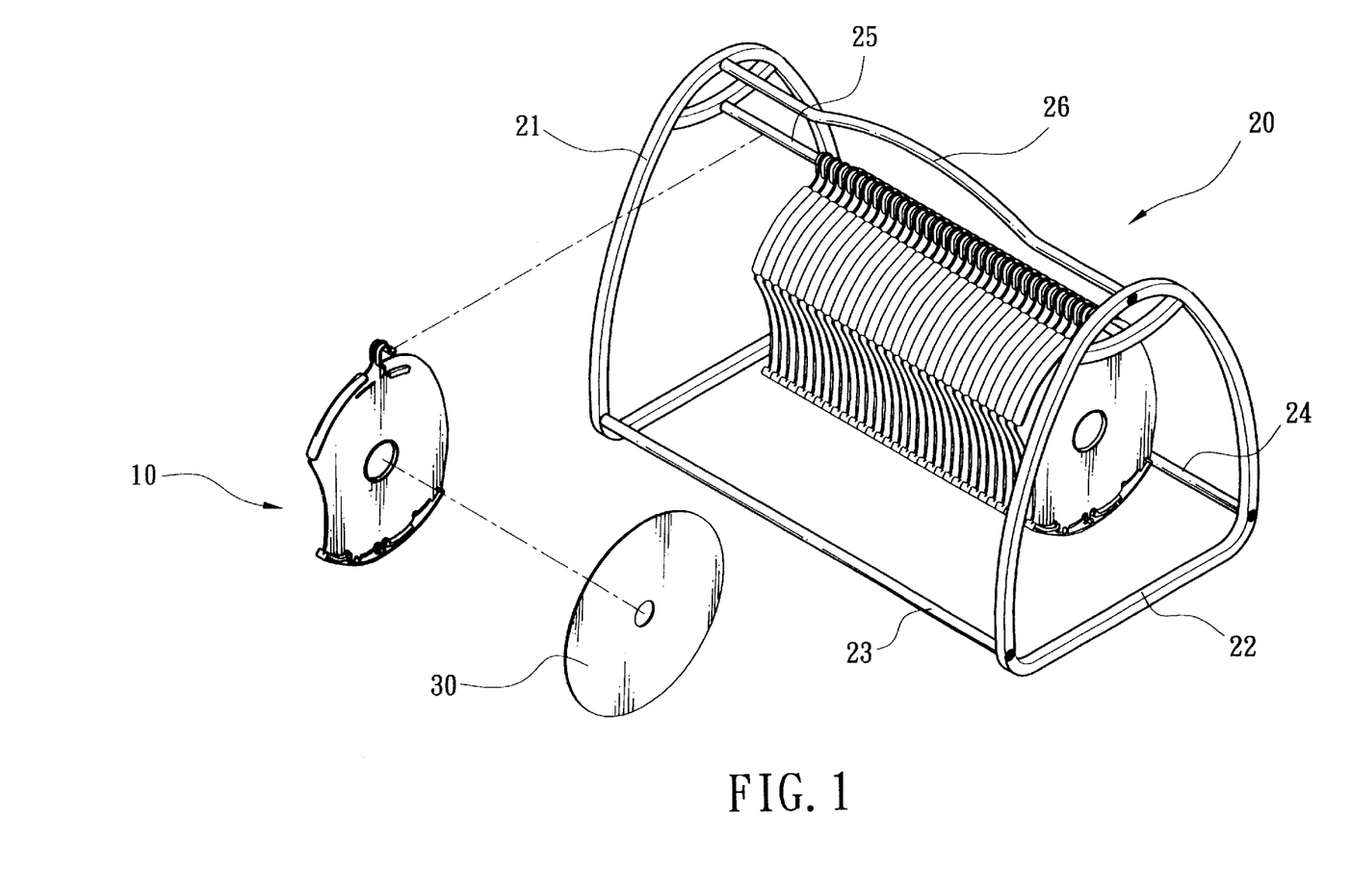
FIG. 1 is a schematic view of a first embodiment of the invention.

Referring to FIG. 1 for a first embodiment of the invention, the optical disk holding apparatus consists of a plurality of hanging units 10 for holding optical disks 30, and a holding unit 20 for hanging and housing the hanging units 10.

Figure 2A:
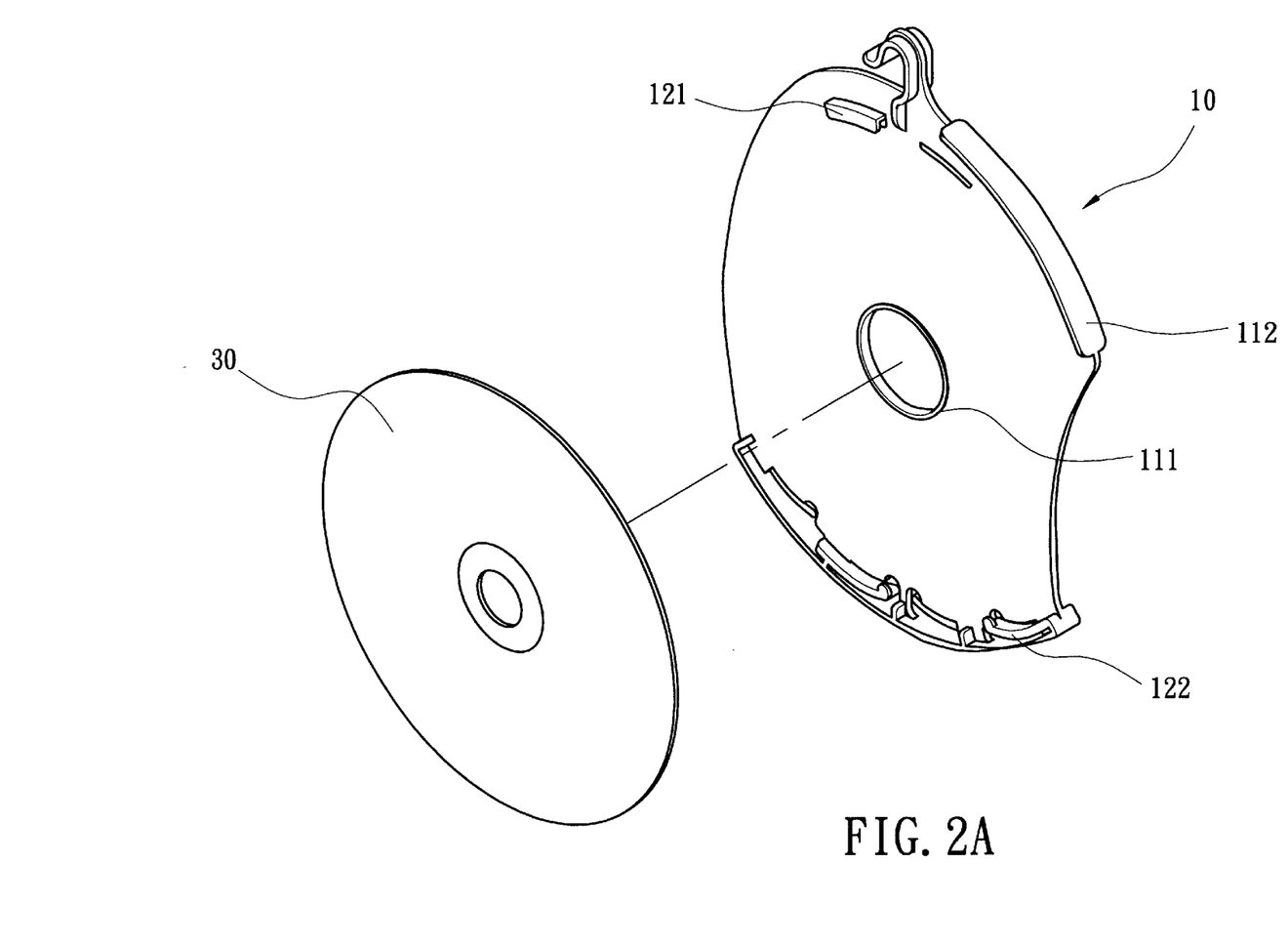
Figures 2B, 2B, 2B:
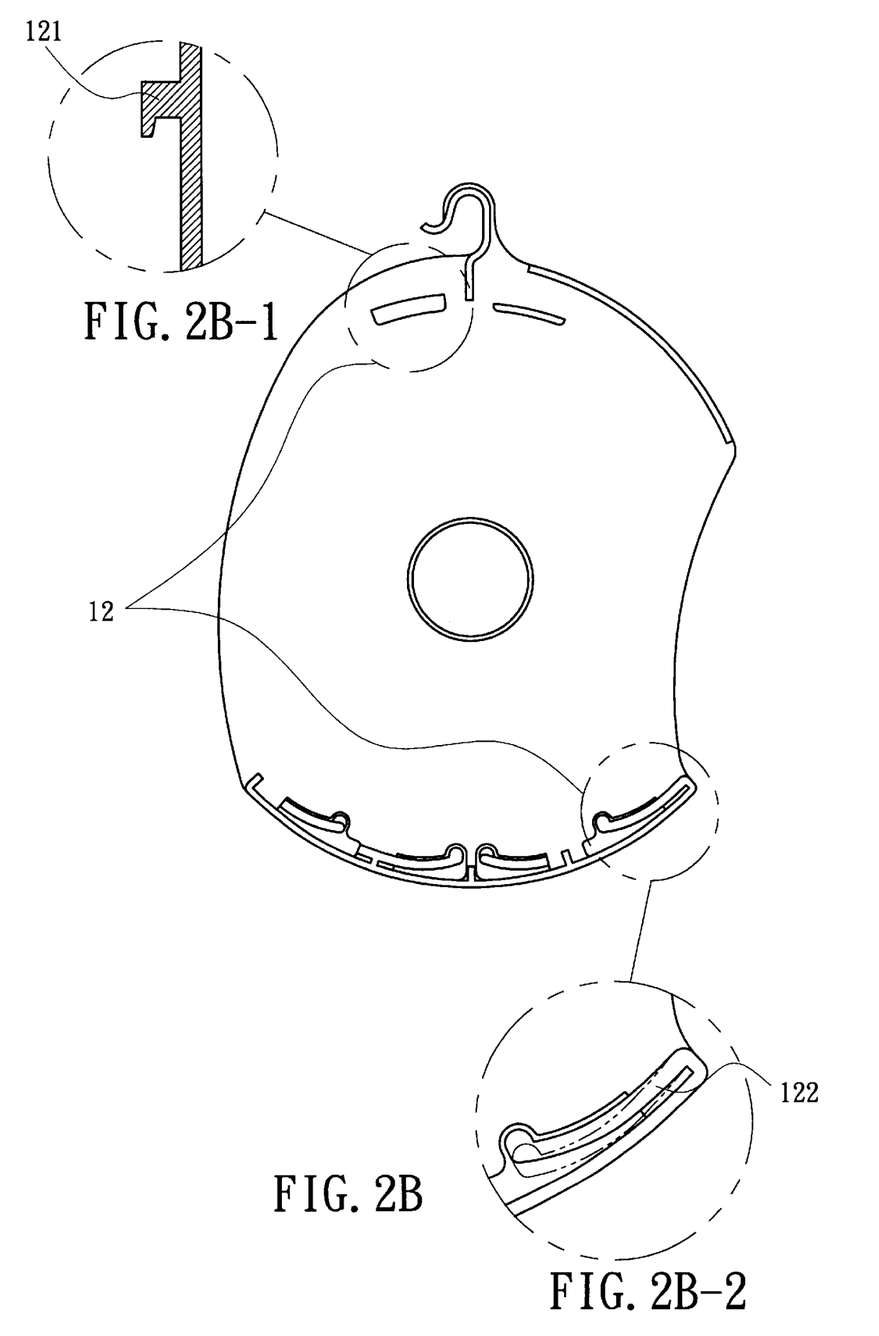
Figure 2C:
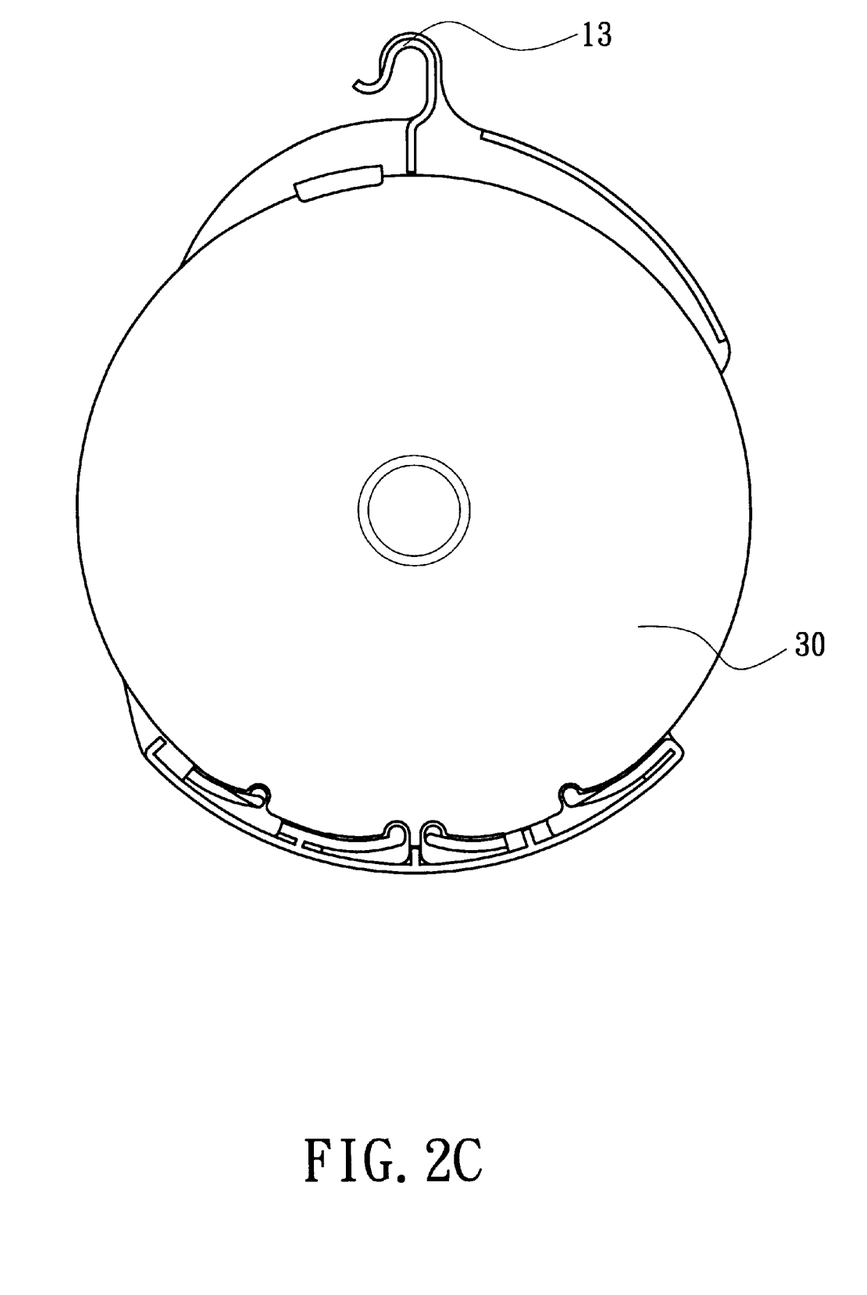

Referring to FIGS. 2A, 2B and 2C, each of the hanging units 10 is made of plastic in substantially a plate form through an integral injection forming process, and includes a plate member 11, a snap clip 12 and a hanging hook 13. The plate member 11 may be formed in any shape desired with a longitudinal length greater than the outside diameter of an optical disk 30 for the snap clip 12 to locate thereon, and a transverse width smaller than the outside diameter of the optical disk 30 to allow users to grasp the outer rim thereof when removing or loading the optical disk 30. In the center of the plate member 11 there is a protruding ring 111 for engaging the optical disk 30 on the plate member 11. The protruding ring 111 creates a gap between the optical disk 30 and the plate member 11 to prevent abrasion of the optical disk 30 and avoid damaging the data area of the optical disk 30. The plate member 11 further may have a label section 112 extended sideways at the top rim thereof for marking the name of the optical disk 30.

Referring to FIGS. 2B-1 and 2B-2, the snap clip 12 is formed on the plate member 11, and includes a clip lug 121 and an elastic lever 122 spaced a selected distance from each other to form a clipping range therebetween such that the optical disk 30 may be sandwiched and held therein. The clip lug 121 has an open slot facing the elastic lever 122 for holding the outer rim of the optical disk 30. The elastic lever 122 is suspended on the plate member 11. Due to the properties of plastic, the elastic lever 122 is moveable in a resilient manner, hence keeping the clipping range at a latch position under normal circumstances. The elastic lever 122 may be moved by force to a release position to extend and enlarge the clipping range.

The hanging hook 13 is extended outwards from one side of the plate member 11 for hanging the plate member 11 on a rod or rope.

The holding unit 20 is an open type rack consisting of a plurality of components, including at least two support frames 21 and 22 spaced a selected distance from each other, two stretcher bars 23 and 24 linking the support frames 21 and 22, a carrying member 25 located between and mounted to the top rims of the support frames 21 and 22, and a handle 26 bridged between the support frames 21 and 22 and located above the carrying member 25. The support frames 21 and 22 are mounted upright on a flat surface to form an open type housing space. The carrying member 25 is above the flat surface at a selected height greater than the length of the hanging unit 10. The carrying member 25 may be a rod or a piece of rope.

Referring to FIGS. 1 and 2C, when users want to store the optical disk 30, they first take the hanging unit 10 and slip one side of the outer rim of the optical disk 30 into the elastic lever 122, and press the elastic lever 122 until moved to the release position so as to enlarge the clipping range. Then slip another side of the optical disk 30 into the clip lug 121 and release to allow the elastic lever 122 to move back by elastic force to the latch position and return to the normal clipping range. The clip lug 121 and elastic lever 122 thus may clip and hold the optical disk 30 securely.

The hanging unit 10 containing the optical disk 30 may then be moved into the housing space of the holding unit 20, and through the hanging hook 13 the hanging unit 10 is hung on the carrying member 25. Similarly, multiple optical disks 30 may be held respectively in the hanging units 10 and hung in the holding unit 20. The hanging units 10 are movable on the carrying member 25. Hence, when retrieving or loading a selected hanging unit 10, the neighboring hanging units 10 may be moved slightly sideways to make retrieving or loading the intended hanging unit 10 more convenient.

Once the hanging unit 10 is taken out of the holding unit 20, grasp the optical disk 30 and apply a small force to move the elastic lever 122 to the release position. The optical disk 30 may then be removed.

In the first embodiment set forth above, the hanging unit 10 clips and holds the optical disk 30 in an open manner, and the holding unit 20 also adapts an open fashion to hang the hanging unit 10. Hence, the movements for storing and retrieving the optical disk 30 are simple and easy.

Figure 3:
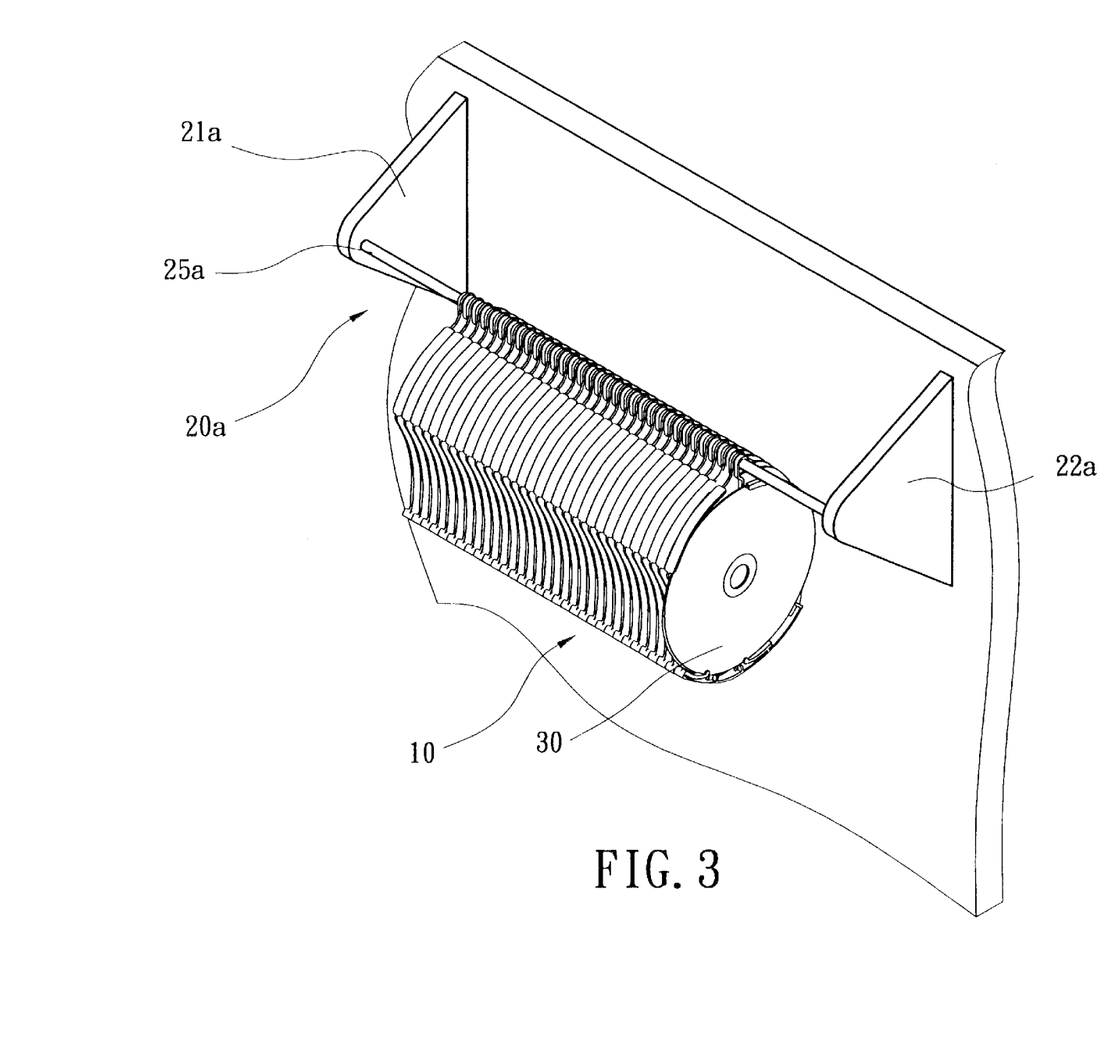
FIG. 3 is a schematic view of a second embodiment of the invention.

FIG. 3 illustrates a second embodiment of the invention. The hanging unit 10 is constructed in a manner similar to that of the first embodiment, but the holding unit 20a is an open type rack including two support frames 21a and 22a spaced a selected distance from each other, and a carrying member 25a bridged between the support frames 21a and 22a. One end of the support frames 21a and 22a may be fastened to a wall or one side of a computer case (not shown in the drawing) by screws or adhesive so that the holding unit 20 may be positioned at an elevated location for hanging the hanging units 10.

Figure 4:
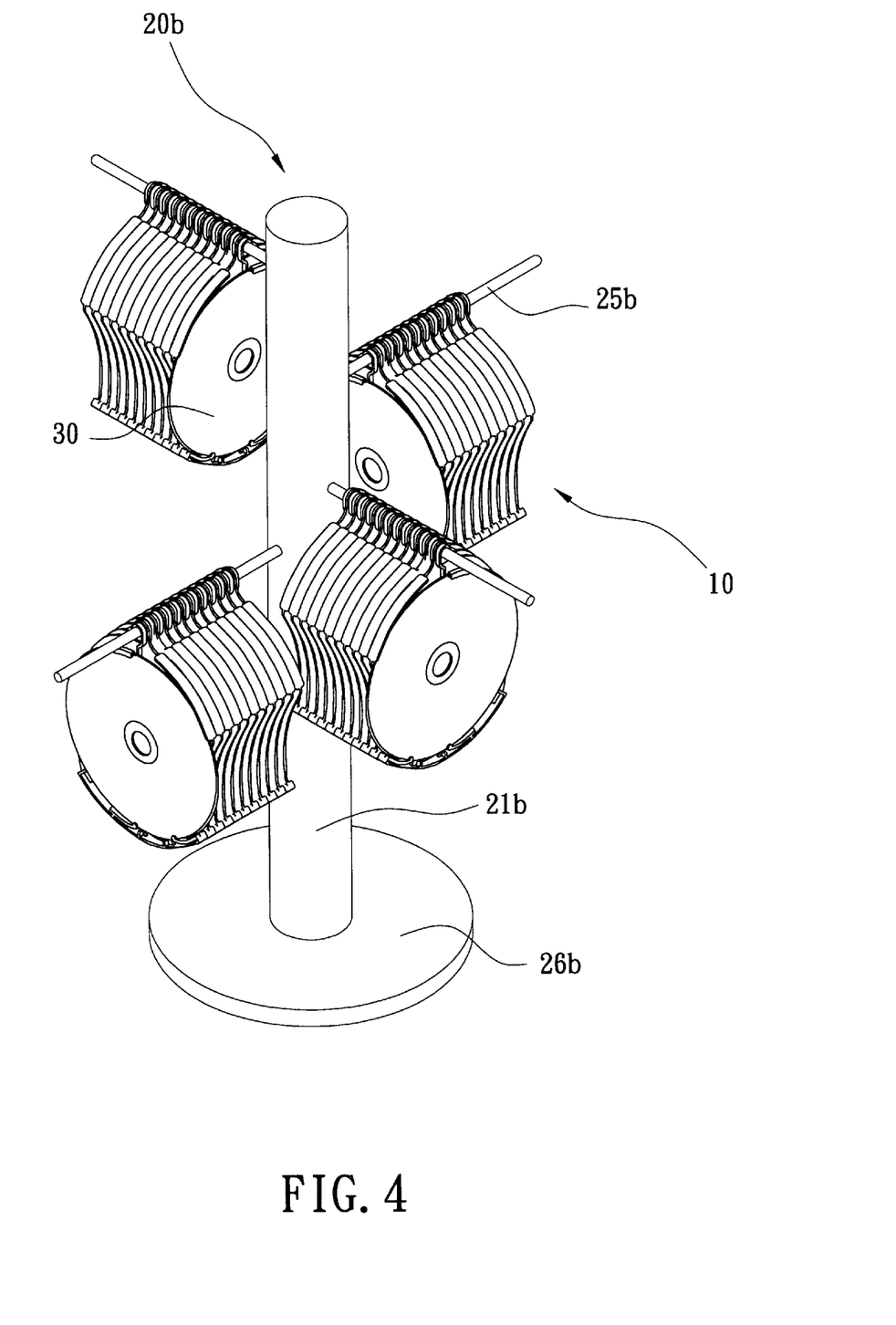
FIG. 4 is a schematic view of a third embodiment of the invention.

FIG. 4 shows a third embodiment of the invention. The holding unit 20b is an open type stand including a pedestal 26b, a support strut 21b extended upright from the pedestal 26b and a plurality of carrying members 25b mounted to the support strut 21b. The carrying members 25b are mounted in a staggered manner such that there is no interference between them. Each carrying member 25b may be used to hang the hanging units 10.

Figure 5:
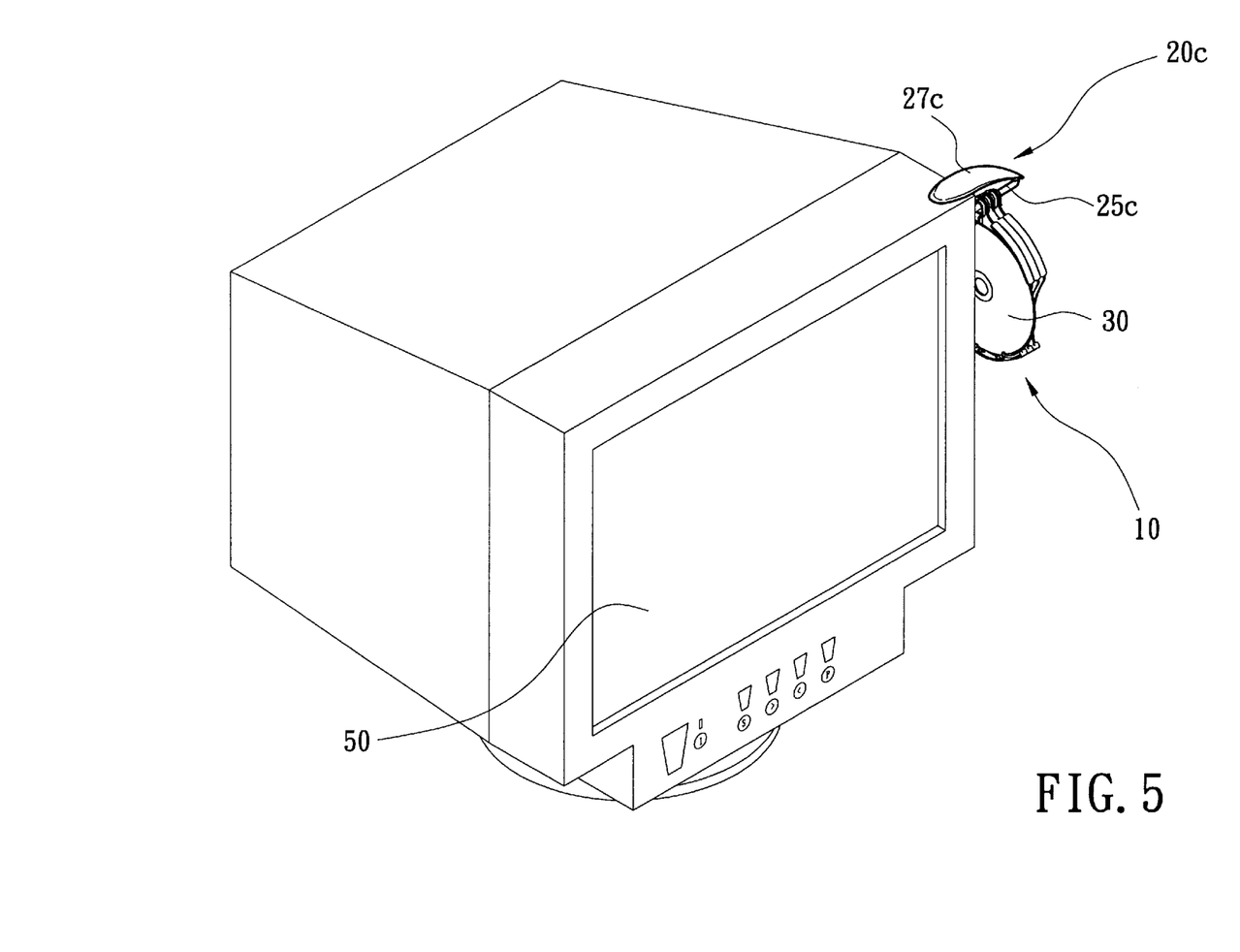
FIG. 5 is a schematic view of a fourth embodiment of the invention.

FIG. 5 depicts a fourth embodiment of the invention. The holding unit 20c is an open type bracket including a saddle member 27c and a carrying member 25c. The saddle member 27c has a flat bottom surface for adhering to a display device 50 through an adhesive element (not shown in the drawing). The carrying member 25c is extended outwards from the saddle member 27c for hanging the hanging units 10.

Figure 6:
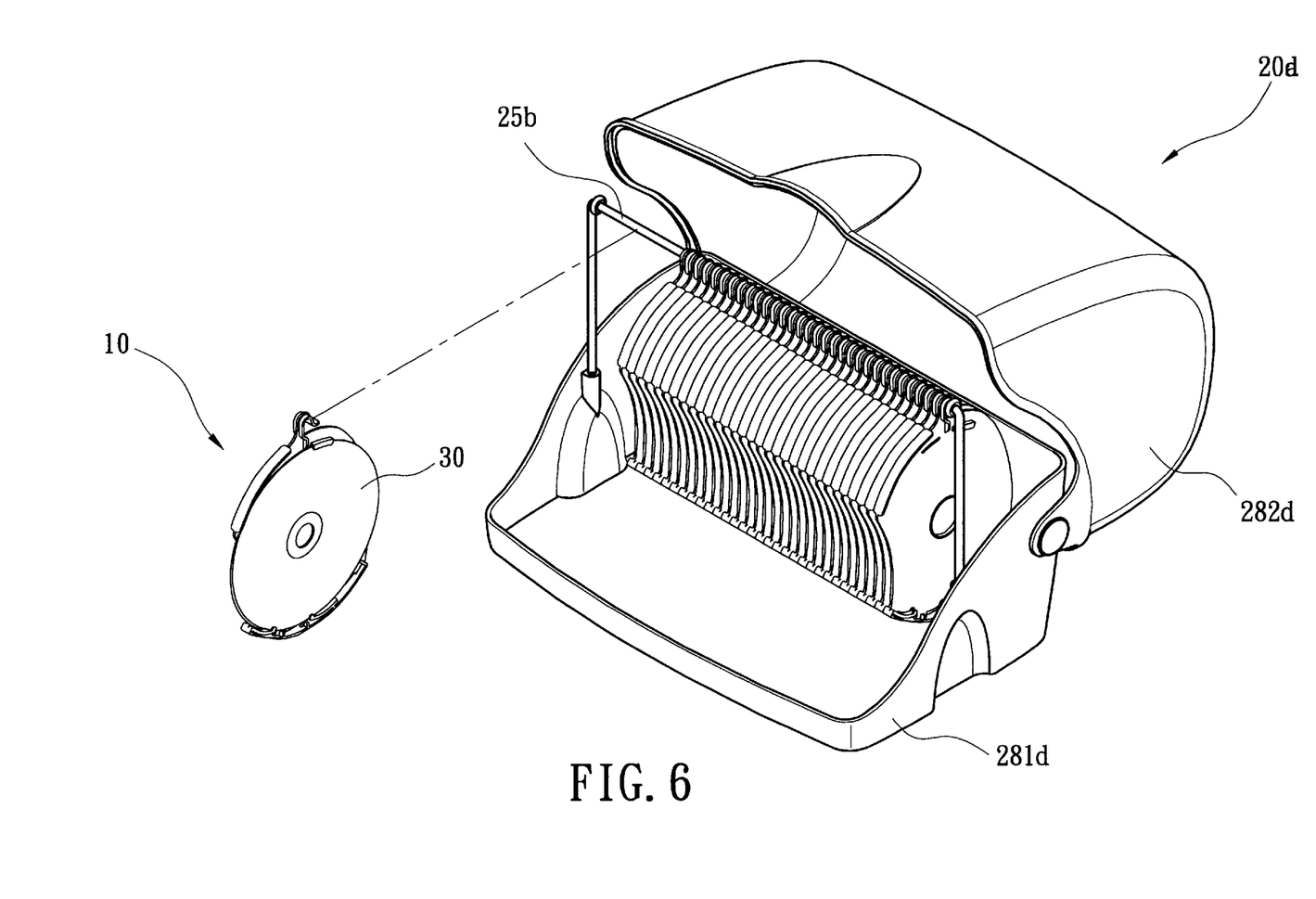
FIG. 6 is a schematic view of a fifth embodiment of the invention.

FIG. 6 shows a fifth embodiment of the invention in which the hanging unit 10 is constructed in a manner similar to that in the first embodiment. The holding unit 20d is a casing that may be selectively opened or closed, and includes at least a container 281d, a cap 282d pivotally engaged with one side of the container 281d and a carrying member 25d. The container 281d and the cap 282d form a housing chamber. The cap 282d may be selectively opened or closed to open or close the housing chamber. The carrying member 25d is located in the container 281d and is elevated to a selected height from the bottom surface of the container 281d. The height is greater than the length of the hanging unit 10. The carrying member 25d may be a rod or a piece of rope.

As shown in the first embodiment, the optical disk 30 is held on the hanging unit 10, and the hanging unit 10 is hung on the carrying member 25d in the holding unit 20d for storing the optical disk 30.

Figure 7:
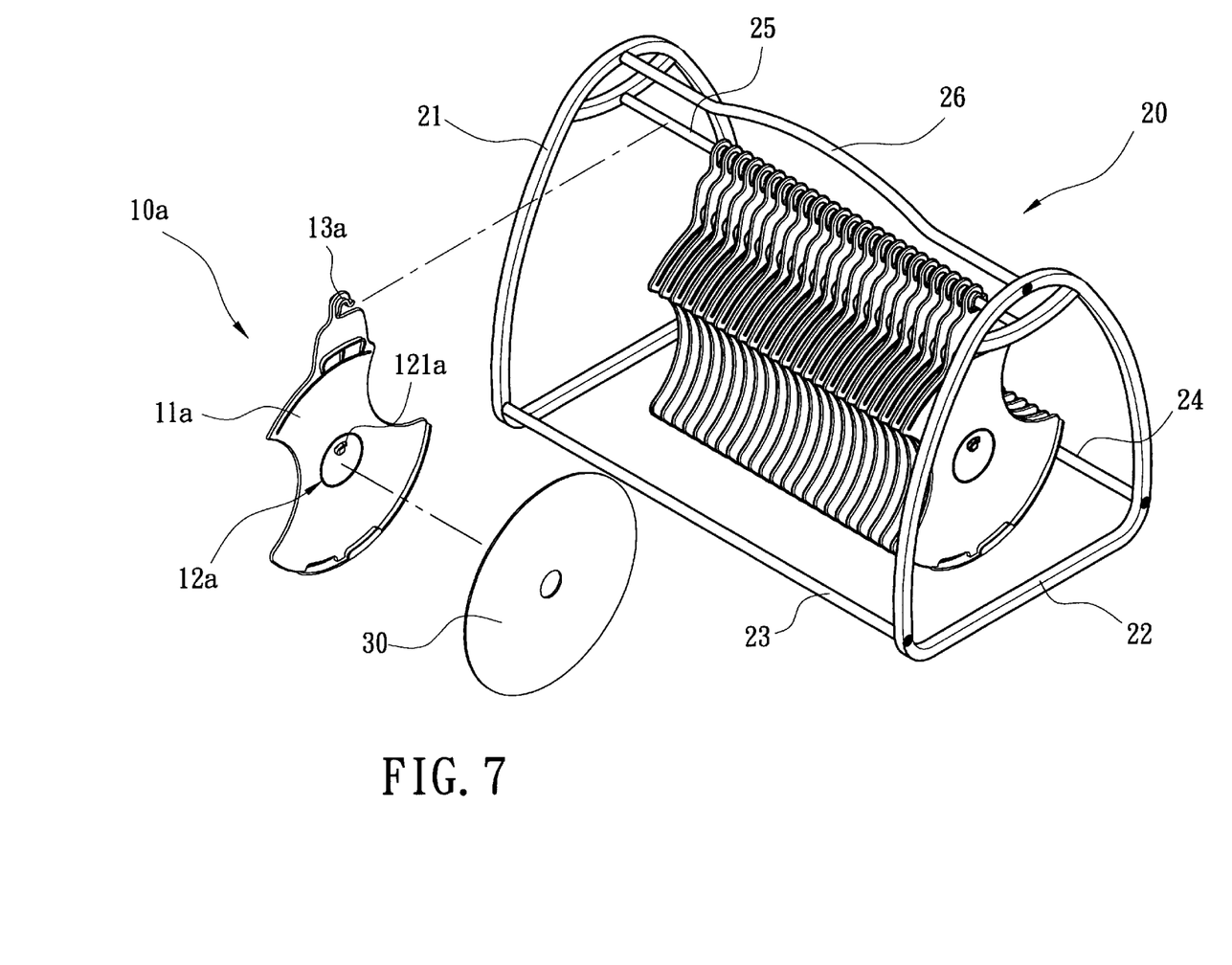
FIG. 7 is a schematic view of a sixth embodiment of the invention.

FIG. 7 shows a sixth embodiment of the invention. The holding unit 20 is constructed in a manner similar to that in the first embodiment. However, the hanging unit 10a is constructed differently. The hanging unit 10a also includes a plate member 11a, a snap clip 12a and a hanging hook 13a. However, the snap clip 12a has a clip hook 121a that has a notch facing upwards for clipping the center opening of the optical disk 30, to directly hold the optical disk 30 on the hanging unit 10a. The hanging unit 10a may be hung on the carrying member of the holding unit 20 by the hanging hook 13a.

Figure 8A:
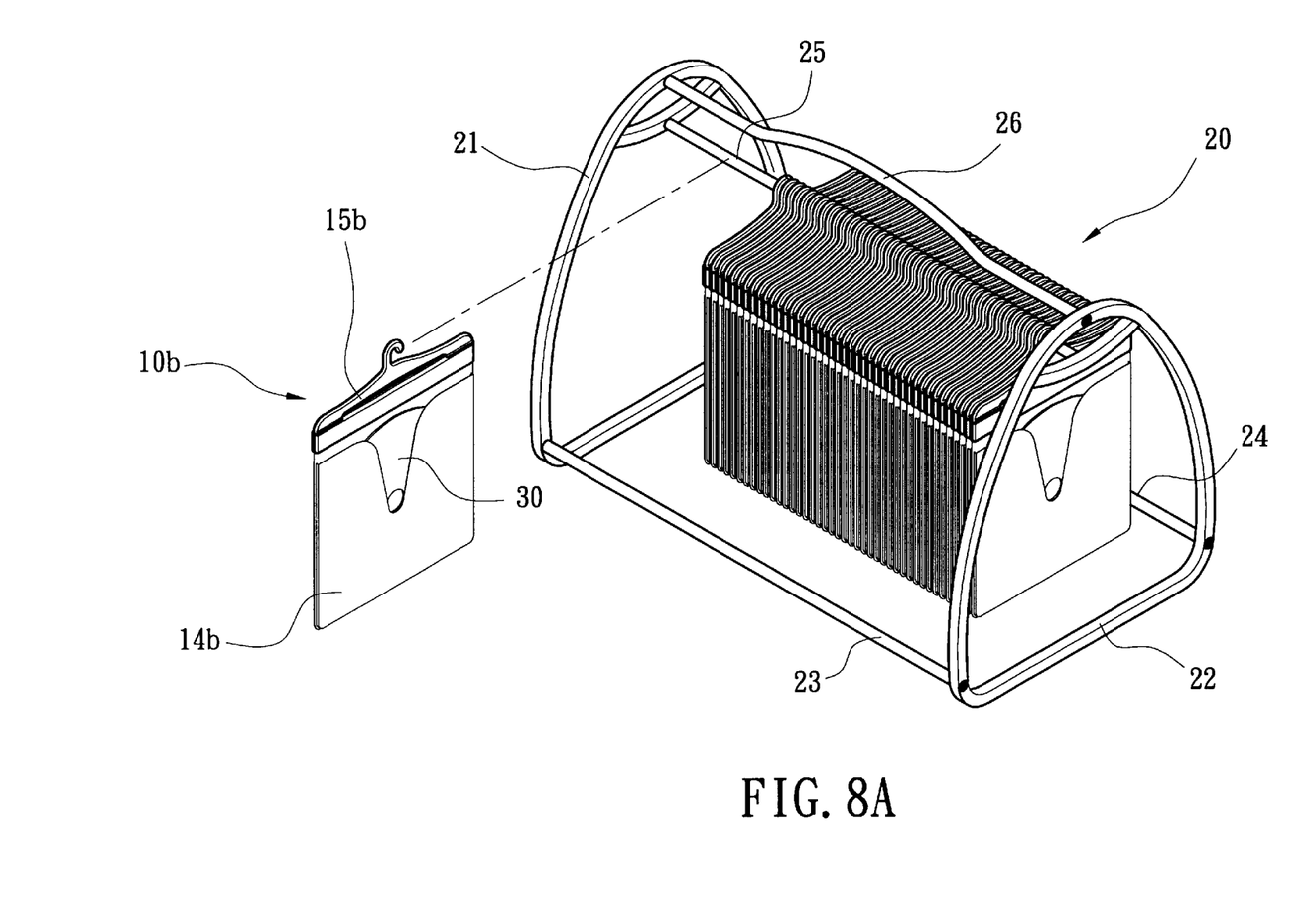
FIG. 8A is a schematic view of a seventh embodiment of the invention.
Figure 8B:
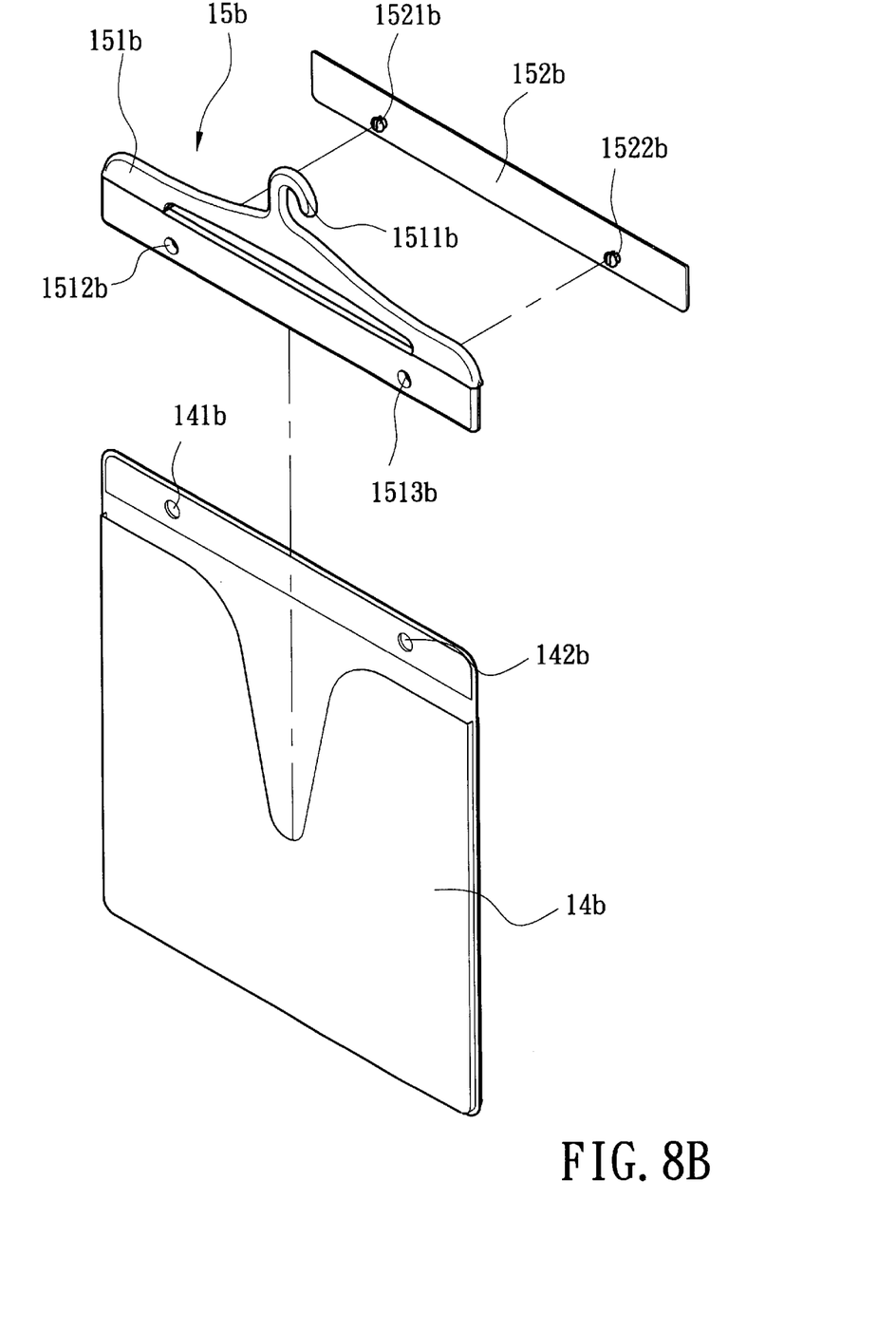
FIG. 8B is a schematic view of a hanging unit for the seventh embodiment.

FIGS. 8A and 8B illustrate a seventh embodiment of the invention. It has a holding unit 20 constructed in a manner similar to that of the first embodiment, but with the hanging unit 10b including a bare pouch 14b and a hanger 15b. The bare pouch 14b is made of a soft non-woven fabric for housing an optical disk 30. The bare pouch 14b has two apertures 141b and 142b.

The hanger 15b includes a frame 151b and a clip blade 152b. The frame 151b has a hook 1511b extending from the center thereof, and openings 1512b and 1513b matching with the apertures 141b and 142b. The clip blade 152b has coupling stubs 1521b and 1522b matched and engageable with the openings 1512b and 1513b for engaging with the apertures 141b and 142b, to thereby fasten the bare pouch 14b to the hanger 15b.

The optical disk 30 is held in the bare pouch 14b and hung on the carrying member 25 of the holding unit 20 by means of the hanger 15b.

The embodiments of the invention set forth above have simpler construction methods than conventional optical disk cartridges or containers. The movements for retrieving and loading the optical disks also are simpler and more effective, and may help to avoid a lot of retrieval errors. Using the hook design allows the hanging units to have flexible hanging angles and distances with less restriction.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An optical disk holding apparatus for housing optical disks, comprising:
    at least one hanging unit including:
        a plate member;
        a snap clip located on the plate member consisting of a clip lug and an elastic lever for forming a clipping range to clip the outer rim of the optical disk, the elastic lever having at least a latch position for maintaining the clip range under normal circumstances and a release position when subject to a force for enlarging the clip range;
        a hanging hook extended outwards from the plate member; and
    a holding unit having an open housing chamber and at least one carrying member for hanging the hanging unit.

2. The optical disk holding apparatus of claim 1, wherein the plate member has a protruding ring formed in the center thereof.

3. The optical disk holding apparatus of claim 1, wherein the plate member has a label section located at the top rim thereof and extended sideways.

4. The optical disk holding apparatus of claim 1, wherein the holding unit is an open type rack.

5. The optical disk holding apparatus of claim 4, wherein the open type rack includes at least two support frames, at least one stretcher bar linking the two support frames, and the carrying member located between the two support frames and mounted to top rims thereof.

6. The optical disk holding apparatus of claim 4, wherein the open type rack includes two support frames mounted to a wall or one side of a computer casing, and the carrying member located between the two support frames.

7. The optical disk holding apparatus of claim 4, wherein the open type rack includes a pedestal, a support strut extended upright from the pedestal and a plurality of the carrying member mounted on the support strut in a staggered manner.

8. The optical disk holding apparatus of claim 4, wherein the open type rack includes a saddle member for bonding to a flat surface through an adhesive element and the carrying member extended outwards from the saddle member.

9. The optical disk holding apparatus of claim 1, wherein the carrying member is a rod.

10. The optical disk holding apparatus of claim 1, wherein the carrying member is a piece of rope.

11. The optical disk holding apparatus of claim 1, wherein the holding unit is a casing which is selectively opened or closed.

12. The optical disk holding apparatus of claim 11, wherein the holding unit includes a container, a cap pivotally engaging with and covering the container, and the carrying member.

13. An optical disk holding apparatus for housing optical disks, comprising:
    at least one hanging unit including at least:
        a bare pouch made of soft fabric for holding the optical disk and having apertures along an upper edge;
        a hanger engagable with the bare pouch, said hanger including a frame and clip blade, said frame having a hook and openings matching said apertures, said clip blade having stubs engagable with said openings and said apertures to fasten said bare pouch to said hanger; and
        a holding unit having an open housing chamber and at least one carrying member for hanging the hanging unit.

14. The optical disk holding apparatus of claim 13, wherein the holding unit is an open type rack.

15. The optical disk holding apparatus of claim 14, wherein the open type rack includes at least two support frames, at least one stretcher bar linking the two support frames, the carrying member located between the two support frames and mounted to top rims thereof, and a handle bridged between the two support frames and located above the carrying member.

16. The optical disk holding apparatus of claim 14, wherein the open type rack includes two support frames mounted to a wall or one side of a computer casing and the carrying member located between the two support frames.

17. The optical disk holding apparatus of claim 14, wherein the open type rack includes a pedestal, a support strut extended upright from the pedestal and a plurality of the carrying member mounted on the support strut in a staggered manner.

18. The optical disk holding apparatus of claim 14, wherein the open type rack includes a saddle member for bonding to a flat surface through an adhesive element and the carrying member extended outwards from the saddle member.

19. The optical disk holding apparatus of claim 13, wherein the holding unit is a casing which is selectively opened or closed.

20. The optical disk holding apparatus of claim 19, wherein the holding unit includes a container, a cap pivotally engaging with and covering the container, and the carrying member.

* * * * *